United States Patent [19]

Fletcher et al.

[11] 4,091,798

[45] May 30, 1978

[54] NON-TRACKING SOLAR ENERGY COLLECTOR SYSTEM

[76] Inventors: James C. Fletcher, Administrator of the National Aeronautics and Space Administration, with respect to an invention of; M. Kudret Selcuk, LaCanada, Calif.

[21] Appl. No.: 765,139

[22] Filed: Feb. 3, 1977

[51] Int. Cl.² ............................................... F24J 3/02
[52] U.S. Cl. .................................... 126/271; 126/270; 350/299
[58] Field of Search ............... 126/270, 271; 237/1 A; 350/292, 293, 299, 288, 298

[56] References Cited

U.S. PATENT DOCUMENTS

| 2,969,788 | 1/1961 | Newton | 126/271 |
| 3,227,153 | 1/1966 | Godel et al. | 126/271 |
| 3,985,116 | 10/1976 | Kapany | 126/271 |
| 4,007,729 | 2/1977 | Chao et al. | 126/271 |
| 4,015,583 | 4/1977 | Laing | 126/271 |

FOREIGN PATENT DOCUMENTS

| 2,303,251 | 10/1976 | France | 126/271 |

*Primary Examiner*—Kenneth W. Sprague
*Assistant Examiner*—James C. Yeung
*Attorney, Agent, or Firm*—Monte F. Mott; John R. Manning; Wilfred Grifka

[57] ABSTRACT

A solar energy collector system characterized by an improved concentrator for directing incident rays of solar energy on parallel vacuum-jacketed receivers or absorbers including a plurality of individually mounted reflector modules of a common asymmetrical triangular cross-sectional configuration supported for independent reorientation and defining a plurality of asymmetric vee-trough concentrators.

1 Claim, 8 Drawing Figures

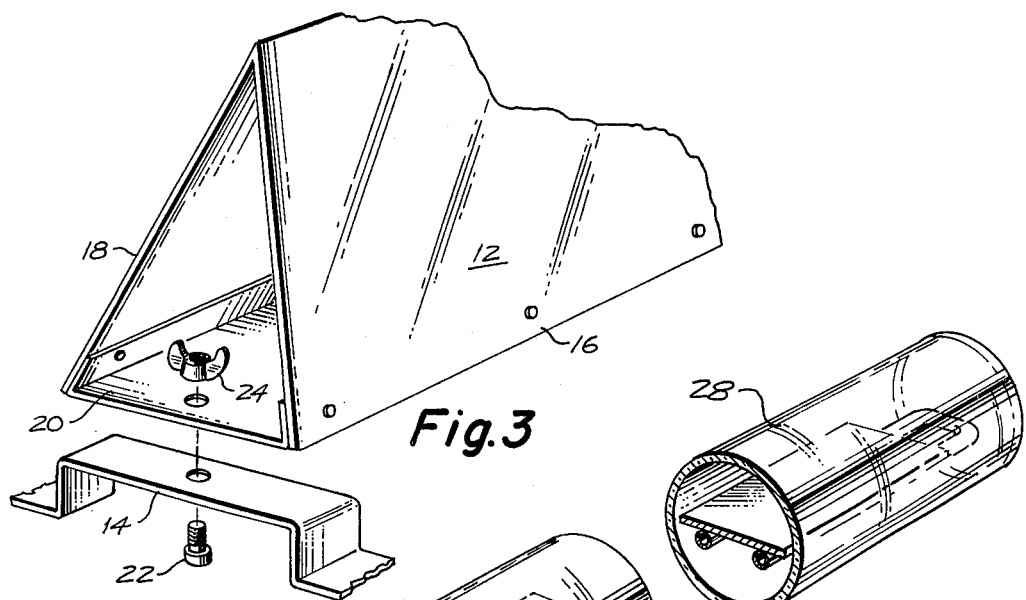
Fig.3
Fig.4
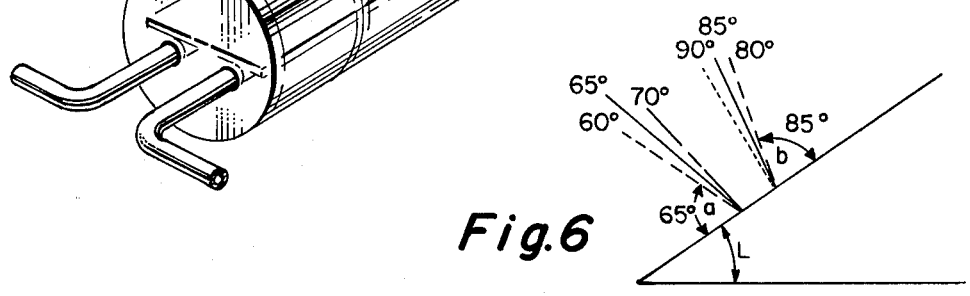
Fig.6
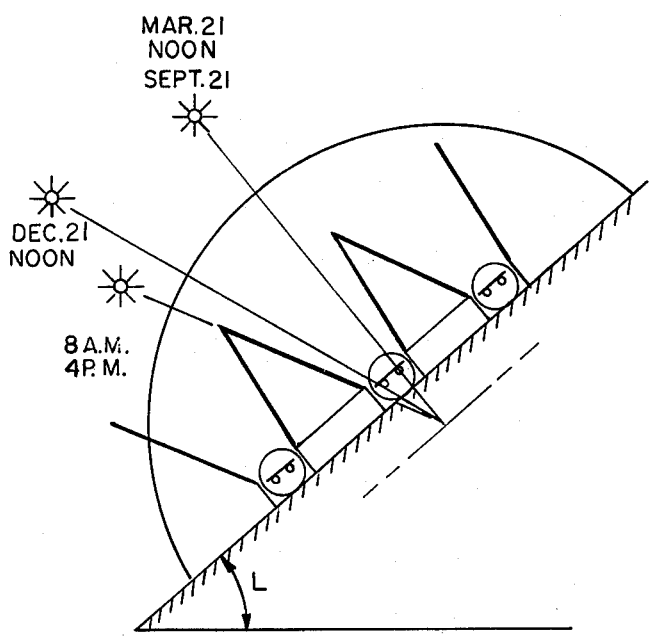
Fig.5A
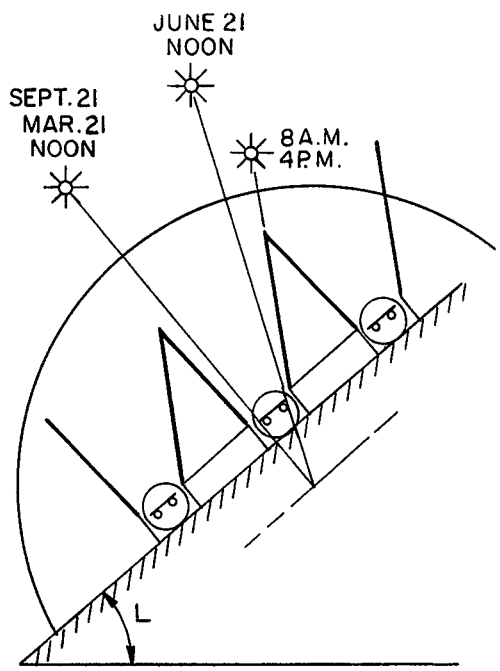
Fig.5B

NON-TRACKING SOLAR ENERGY COLLECTOR SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to non-tracking solar energy collector systems and more particularly to a collector system characterized by an improved solar energy concentrator having a plurality of independently supported asymmetric reflector modules for directing incident beams of solar energy on segments of a vacuum-jacketed receiver arranged in parallelism.

2. Description of the Prior Art

Currently, substantial quantities of time and funds are being devoted to a search for sources of energy which can be utilized to replace more conventional sources of energy, such as fossil fuels.

It has long been recognized that the sun provides a substantially endless source of energy. For example, it has long been recognized that a conversion of solar energy to other forms of usable energy can be achieved simply by converting solar energy to steam which is, of course, usable for numerous purposes including the generation of electrical power. Moreover, systems employed in converting solar energy to more useful forms of energy normally are considered to be simple and economic to fabricate and maintain. These recognized advantages have led many investigators toward further development of solar energy conversion systems having a capability for more readily and economically converting solar energy to other usable forms of energy.

The future success of solar energy conversion systems is believed by many to be dependent in large measure upon the availability of efficient collector systems, particularly in environments in which the required temperatures are in ranges extending from approximately 100° to 200° C. Moreover, collector systems must be reliable in performance, require little maintenance, be relatively economic to fabricate and operate, and, finally, must be characterized by high strength-to-weight ratios which facilitate mounting of the systems in operative environments, such as on roofs of homes, in which the systems are subjected to both mechanical and thermal stresses of varying degrees of severity.

Consequently, numerous attempts have been made to improve the efficiency in performance of fixed collectors and/or to reduce the costs thereof. To exemplify, concentrators including mirror boosters have been used with varying degrees of success. Similarly, vacuum tubes and the like have been used as collectors with similar results. Unfortunately, the collectors heretofore known tend to suffer from certain undesirable characteristics. For example, mirror boosters, even vee-trough reflectors, previously employed, all require tracking and/or collector tilt adjustments in order to accommodate diurnal and seasonal changes in the relative positions of the sun. Thus the mass and complexity of known systems tend to render the use thereof undesirable from an economic standpoint.

Since non-tracking, flat-plate collectors do not require tracking or tilting, they may be said to represent the lowest capital cost per square foot of collector surface available for conversion of solar energy. However, the systems currently marketed for heating water and the like do not appear to be cost effective, particularly where the systems are relied upon to generate power on an annual basis. This apparent disadvantage arises out of the fact that performance of currently available flat-plate collectors tends to be relatively poor at elevated temperatures due to excessive heat loss from the absorber plates employed.

Among the various approaches taken in reducing radiation losses from absorber plates of flat-plate collectors operating at temperatures above 100° C is to employ various coatings. It is known that convection losses, on the other hand, can be suppressed by using honeycomb cells or by providing evacuated chambers between the absorber plate and the transparent cover normally provided therefor. Unfortunately, the use of honeycomb cells tends to reduce the incoming flux by absorption and, also, increases the backward conduction. Moreover, there are potential problems inherent in plastic honeycomb materials and, of course, glass honeycombs are excessively expensive.

Reduction of convective losses through a use of evacuated chambers requires the use of good seals in order to maintain the required levels of vacuum during the lifetime of the system within which the seals are employed. Such seals are, of course, often difficult to maintain. Furthermore, it should be appreciated that for flat-plate collectors of customary dimensions, a transparent cover must be supported by suitable members, referred to as pegs, in order to eliminate stress-induced cracking resulting from forces occurring due to atmospheric pressures. These pegs, unfortunately, also tend to increase conduction losses. Furthermore, even though plastic covers offer some advantages over glass, from a stress standpoint, operational problems such as scratching, distortion and even melting under static conditions and degassing under vacuum are encountered.

Recently, evacuated tube collectors using borosilicate glass tubes have been suggested for use in non-tracking solar heat collector systems. Moreover, glass to metal vacuum seals apparently capable of being employed over long periods of time, without experiencing undesirable degradation, have been employed with these tube collectors. As a consequence, vacuum tubes tend to present a number of advantages over conventional flat-plate designs, from both a thermal performance and a longevity viewpoint. Unfortunately, however, when employed in non-tracking flat-plate systems, the economics costs of vacuum tubes are substantially greater than those of conventional flat-plate systems and thus render the resulting energy excessively expensive.

Since no existing system has provided a practical solution to the problem of providing for satisfactory cost effectiveness in systems capable of converting solar energy to more usable energy forms, in practical quantities, there currently exists a need for a non-tracking solar energy system which is simple and economic to fabricate, substantially efficient in operation and characterized by low initial and operational costs.

OBJECTS AND SUMMARY OF THE INVENTION

It is an object of the instant invention to provide an improved solar energy collector system which overcomes the aforementioned difficulties and disadvantages.

It is another object to provide in a solar energy collector system a non-tracking, non-tilting solar energy concentrator having year-round operational capabilities.

It is another object to provide in a non-tracking solar energy collector system having a capability for converting low-cost liquids to vapors at relatively low costs.

It is another object to provide in a lightweight, relatively efficient non-tracking, non-tilting solar energy collector system an energy concentrator having both diurnal and annual operational capabilities and characterized by low economic costs.

These and other objects and advantages are achieved through the use of a solar energy concentrator having a plurality of individually reversible reflector modules, of a common asymmetrical triangular cross-sectional configuration, dispersed in a uniform array and characterized by adjacent reflector surfaces disposed in inclined planes converging beneath the plane of a coplanar array of permanently mounted juxtaposed segments of a vacuum-jacketed absorber configured to conduct a fluid, such as water or the like, along a serpentine path between the reflector surfaces of the modules.

BRIEF DESCRIPTION OF THE DRAWINGS

FIG. 3 is an exploded, partially fragmented perspective view of one of a plurality of reflector modules which functions as an energy concentrator within the system shown in FIG. 1.

FIG. 4 is a fragmented perspective view of a solar energy receiver.

FIGS. 5A and 5B are diagrammatic views which illustrate, collectively, the solar aspect for successive seasons of an annual cycle.

FIG. 6 is a graphic view depicting a series of different aspect angles for adjacent reflector surfaces for the modules of the system shown in FIG. 1.

DESCRIPTION OF THE PREFERRED EMBODIMENT

Figure 1:
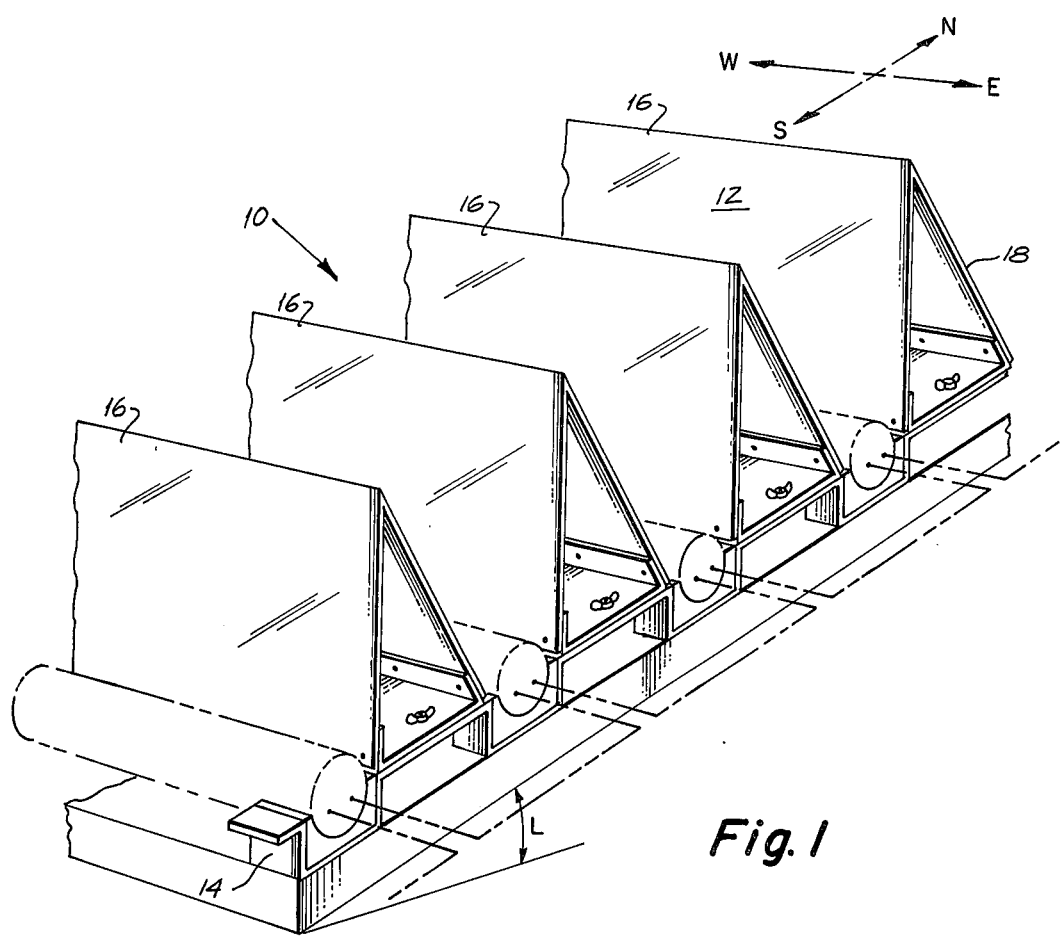
FIG. 1 is a fragmented perspective view of a solar energy collector system embodying the principles of the instant invention.
Figure 2:
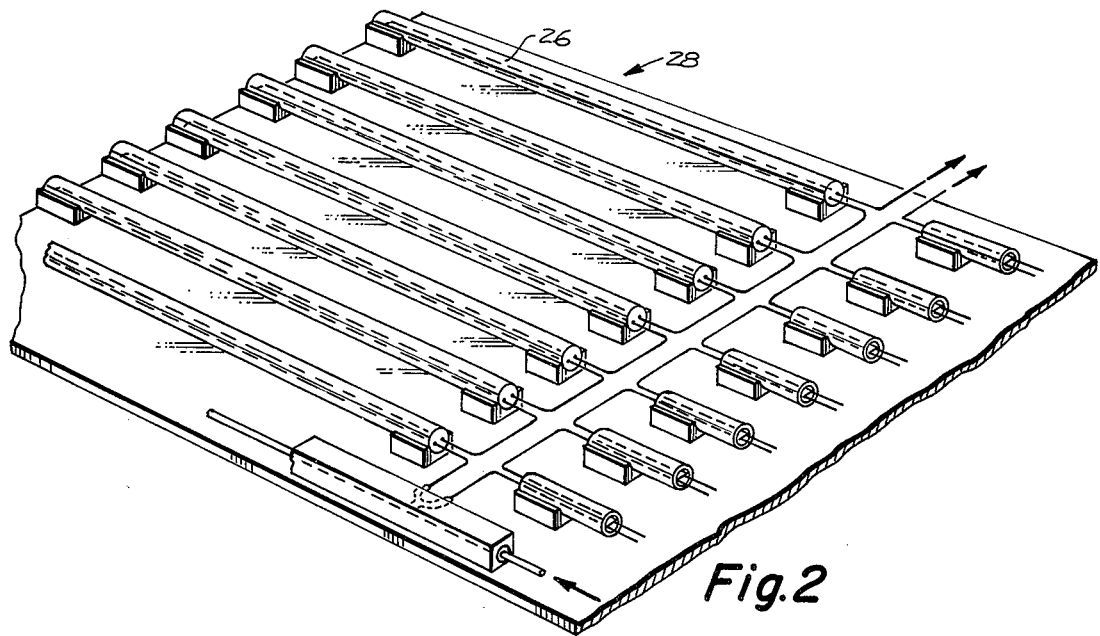
FIG. 2 is a perspective schematic view of a receiver array which functions as a solar energy receiver within the collector system shown in FIG. 1.

Referring now to the drawings with more particularity, wherein like reference characters designate like or corresponding parts throughout the several views, there is illustrated in FIG. 1 a non-tracking, non-tilting solar energy collector system, generally designated 10, which embodies the principles of the instant invention.

The system 10 is of lightweight contruction and is particularly suited for use when mounted on rooftops of buildings and the like. When so employed, the system is tilted to latitude indicated by the angle L in FIGS. 1 and 6. It is important to appreciate that since the system 10 is particularly suited for use atop roofs and the like, it is desirable that the system possess a good strength-to-weight ratio as well as to be efficient in its collection and conversion of solar energy.

The system 10 includes a vee-trough energy concentrator comprising a plurality of individual modules 12 of a common asymmetric triangular cross-sectional configuration arranged in similarly ordered spaced parallelism. In practice, the modules 12 are formed from a lightweight material, such as aluminum and the like, utilizing conventional fabricating techniques fully understood by those familiar with the sheet metal industry. Due to the triangular configuration of the modules, each is characterized by an exceptionally good strength-to-weight ratio. Thus the system is particularly adapted for use on rooftops of homes and the like.

Each of the modules 12 is supported by an angulated bracket 14, preferably formed of a strap stock material, and is provided with side plates, not designated, having a pair of intersecting reflecting surfaces, designated 16 and 18. The side plates are interconnected by a base plate 20 located in a plane paralleling the plane of the system. While the reflecting surfaces 16 and 18, as shown, comprise highly polished metallic surfaces, it is to be understood that, where desired, these surfaces are formed through a use of reflectors comprising sheets of reflective Mylar bonded to said side plates and the like.

It is important to appreciate that since the modules 12 are of asymmetrical configurations, the included angles defined between the planes of the reflecting surfaces 16 and 18 of adjacent modules 12, hereinafter referred to as aperture angles, are not symmetric with respect to planes normal to the plane of the system 10. As illustrated in FIGS. 3, 5A and 5B, the apertures defined between adjacent modules 12 are tilted with respect to the plane of the systems. In order to facilitate reorientation of the modules 12 for varying the magnitude of the tilt of the aperture angles, each module is mounted on a pair of mutual brackets 14 utilizing screws 22 extended through coaxially aligned apertures formed in the brackets and the base plate 20. Wing nuts 24 are used for securing the screws 22 in place. Simply by loosening the nuts 24, manually, removal and remounting of each of the modules 12 is facilitated. Thus the tilt of the aperture angles is selectively changed.

It should be understood further that the modules 12 are of a substantially common configuration and that they are uniformly interspersed between a plurality of interconnected parallel segments, designated 26, of a vacuum tube receiver, generally designated 28. Each of the segments 26, preferably, comprises an evacuated borosilicate glass tube collector, of known design, supported at its opposite ends by a pair of brackets 30. Hence, the receiver 28 functions as a segmented solar energy collector which receives rays of solar energy concentrated by the vee-trough concentrator.

The plane in which the sun's apparent motion occurs is perpendicular to the plane of the system 10 at the equinoxes. The tilt of the plane is less, of course, than 90° for winter months but more than 90° for summer months. Early morning and late afternoon positions of the sun vary from the noon position of the sun to such an extent that a single symmetrical vee-trough reflector is not capable of maintaining a useful concentration factor for year-round operation, unless the tilt of the plane of the system is adjusted at least twice a year.

However, by individually mounting the modules 12, which form asymmetrical vee-trough reflectors, so that the axes of the vee-troughs lie in east-west directions, the need for tilt change for the system 10 with respect to latitude is eliminated because orientation of the modules 12 can be reversed for thus changing the tilt of the aperture of the vee-trough reflectors.

Figure 7:
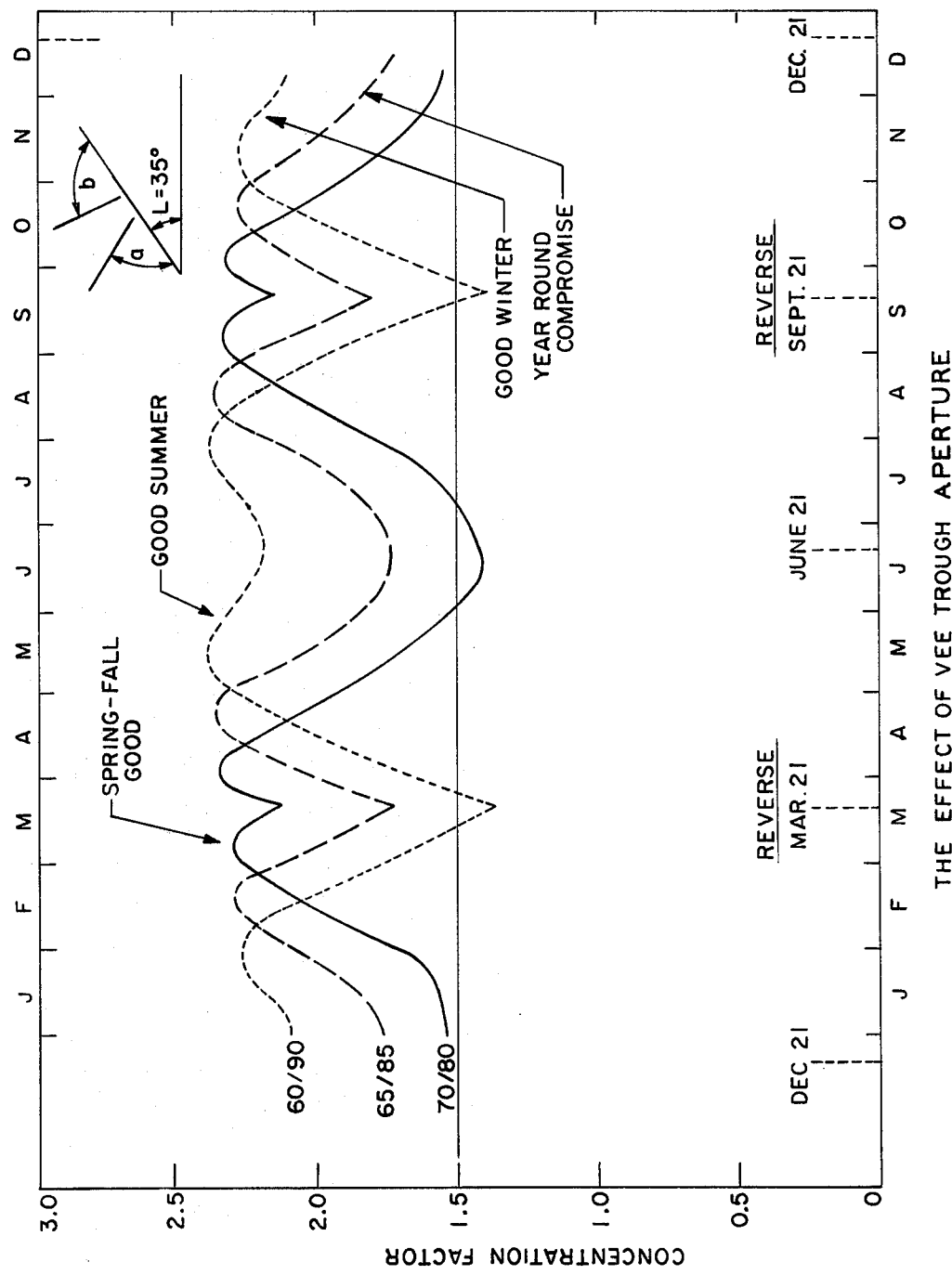
FIG. 7 is a graphic view illustrating the overall effectiveness, in terms of concentration factors, for different slope angles during various seasons.

The geometric concentration ratio, which can be defined as the area of the aperture defined at the opening of the aperture angles, between the tops of the modules 12, to the area of the bottom openings of the aperture angles, i.e. the openings defined between the bottoms of the modules, is constant. The actual concentration factor is the ratio of the concentrated solar radiation intensity at the bottom opening of a vee-trough to the flux at its aperture. If the aperture angle is varied in size, the year-round average concentration factor is affected, as illustrated in FIG. 7. Smaller aperture angles tend to yield higher peak intensities during summer and winter, whereas larger aperture angles result in a more uniform year-round concentration factor distribution.

Assuming that the angle L is the angle of latitude for any locality, the effect of the vee-trough reflector for different seasons can be established, through computation or empirically, as desired. For example, assume that the plates for surfaces 16 and 18 are so inclined as to establish a first included angle, designated angle $a$, at 60° and a second included angle, designated angle $b$, at 90°, respectively, the aperture angle will be 30° and the concentration factor will be above 2.0 during the summer and winter, but poor during the spring and fall seasons, as depicted in FIG. 7. Assuming angles $a$ and $b$ to be 65° and 85°, respectively, the aperture angle is still 30°, but the swing of the concentration factor is reduced throughout the year.

Although the concentration factor is not as good during the winter as in the summer, when angles $a$ and $b$ are 65° and 85°, it is somewhat better in the spring and fall than that achieved using angles of 60° and 90°. Going one step further, it is noted that where the angles are 70° and 80°, the concentration factor is particularly good during the spring and fall but very poor during winter and summer.

Therefore, it can be appreciated that compromise and trade-off can and should be utilized in determining the angles for the plates of the reflecting surfaces 16 and 18. Moreover, it is to be understood that the optimum angles for the planes of the reflecting surfaces 16 and 18 will be varied as the angle of latitude L for various locations.

It is recommended that the modules 12 be reversed on the equinoxes to establish seasonal relationships for the angles indicated as follows:

| (March 21 through Sept. 21) | | (Sept. 21 through March 21) | |
| --- | --- | --- | --- |
| Angle a | Angle b | Angle a | Angle b |
| 60 | 90 | 90 | 60 |
| 65 | 85 | 85 | 65 |
| 70 | 80 | 80 | 70 |

The segments 26 of the vacuum tube receiver 28 are fitted into receivers, not designated, located at the bottom openings of the vee-trough reflectors in order to best utilize the concentrated flux. The performance of the vacuum-jacketed collector has been analytically and experimentally examined and peak collection efficiencies in the order of 60 percent are reported for temperatures around 150° to 200° C for solar radiation intensities of about 900–1000W/m².

OPERATION

It is believed that in view of the foregoing description, the operation of the device is readily understood, however, it will be briefly reviewed at this point.

The system 10 of the instant invention preferably is mounted atop a roof, or similar planar surface, with the conduit 28 being connected between a source of fluid. The plane of the system 10 is tilted at an angle equal to angle L, the latitude of the system.

The modules 12 are, of course, disposed in an east-west orientation and interspersed uniformly between the segments 26 of the conduit 28. For the season beginning March 21 and ending September 21, the modules 12 are so arranged that the planes of the reflecting surfaces facing north define with the plane of the system an included acute angle substantially greater than the acute angle defined by the plane of the opposite reflecting surfaces and the plane of the system, FIG. 5B. Thus the aperture angles are caused to be tilted in a northerly direction. Hence, as the sun approaches the Tropic of Cancer and returns to the equator, the segments 26 are exposed to maximum diurnal radiation. The orientations of the modules 12 are reversed at the fall equinox, in order to reverse the tilt of the aperture angles, so that as the sun approaches the Tropic of Capricorn and returns to the equator, the segments 26 are exposed to maximum diurnal radiation.

In view of the foregoing, it should readily be apparent that the system of the instant invention provides a practical, lightweight, efficient, simple and inexpensive system, having a capability of generating steam and the like, which tends to reduce costs for converting solar energy to more useful forms.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In a non-tracking solar energy collector system characterized by a vacuum-jacketed receiver including a plurality of uniformly spaced segments arranged in coplanar parallelism for conducting fluid along a serpentine path, the improvement comprising:
    an energy concentrator for directing incident rays of solar energy on the segments of the conduit including a plurality of individually mounted, elongated, uniformly dimensioned reflector modules of a common asymmetrical triangular cross-sectional configuration dispersed in a uniform array and characterized by adjacent reflector surfaces disposed in inclined planes sequentially intersecting above and beneath the plane of the segments of the conduit, each reflector module of the plurality being oriented in east-west alignment and characterized by a pair of reflector surfaces oppositely inclined in north-south directions at mutually distinct angles of inclination relative to the planes of the segments of the conduit for thus defining between adjacent pairs of modules apertures uniformly tilted in north-south directions; and
    means for varying the tilt of the apertures including means for facilitating a reversal of the angle of inclination at which said reflector surfaces are tilted in north-south directions.

* * * * *